(12) United States Patent
Jin et al.

(10) Patent No.: US 12,030,812 B1
(45) Date of Patent: Jul. 9, 2024

(54) UNDERWATER RAPID REPAIR MATERIAL FOR MARINE STEEL STRUCTURE

(71) Applicant: Qingdao University of Technology, Qingdao (CN)

(72) Inventors: Zuquan Jin, Qingdao (CN); Bo Pang, Qingdao (CN); Yunsheng Zhang, Qingdao (CN); Dongshuai Hou, Qingdao (CN); Heping Zheng, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 0 days.

(21) Appl. No.: 18/429,030

(22) Filed: Jan. 31, 2024

(30) Foreign Application Priority Data

Aug. 10, 2023 (CN) .......................... 202311005889.8

(51) Int. Cl.
  *C04B 28/00* (2006.01)
  *C04B 24/02* (2006.01)
  *C04B 103/00* (2006.01)
  *C04B 111/74* (2006.01)

(52) U.S. Cl.
  CPC .......... *C04B 28/006* (2013.01); *C04B 24/023* (2013.01); *C04B 2103/0046* (2013.01); *C04B 2111/74* (2013.01)

(58) Field of Classification Search
  CPC ................ C04B 28/006; C04B 24/023; C04B 2103/0046; C04B 2111/74
  See application file for complete search history.

(56) References Cited

FOREIGN PATENT DOCUMENTS

| | | |
|---|---|---|
| CN | 104497480 A | 4/2015 |
| CN | 108373277 A | 8/2018 |
| CN | 108609876 A | 10/2018 |
| CN | 108947426 A | 12/2018 |
| CN | 111263783 A | 6/2020 |
| CN | 111363374 A | 7/2020 |
| CN | 113913084 A | 1/2022 |
| CN | 114751683 A | 7/2022 |
| CN | 115140999 A | 10/2022 |
| CN | 115557739 A | 1/2023 |
| CN | 115557748 A | 1/2023 |
| CN | 116376084 A | 7/2023 |
| WO | 2021109986 A1 | 6/2021 |

*Primary Examiner* — Anthony J Green

(57) ABSTRACT

An underwater rapid repair material for marine steel structure comprises: 20 to 50 parts by weight of an alkali activation material, 3 to 12 parts by weight of a fast hardening waterborne polymer curing agent, 2 to 8 parts by weight of a fast hardening waterborne polymer precursor, 30 to 100 parts by weight of an aggregate, 1 to 5 parts by weight of an activator and 3 to 20 parts by weight of a water. The underwater rapid repair material provided by the present invention is not dispersed and segregated in water, with an initial setting time as low as 0.5 hours and a final setting time as low as 1.1 hours, after pouring 3 hours, the compressive strength and flexural strength can reach about 60 MPa and 10 MPa respectively, and has high bonding strength to steel and is not easy to fall off after solidification.

5 Claims, 1 Drawing Sheet

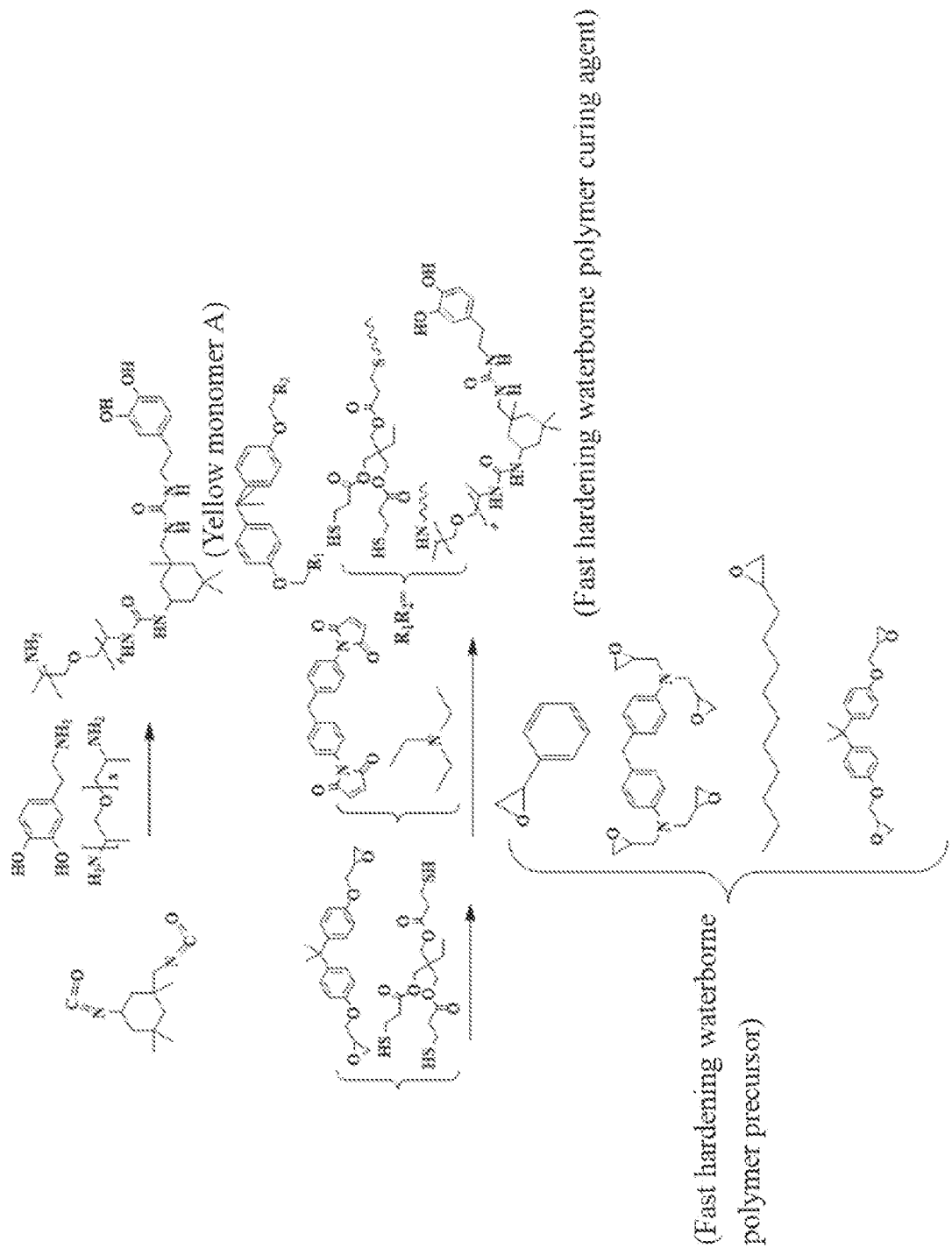

UNDERWATER RAPID REPAIR MATERIAL FOR MARINE STEEL STRUCTURE

FIELD OF THE INVENTION

The present invention relates to the technical field of underwater steel structure repair material, and in particular to an underwater rapid repair material for marine steel structure.

BACKGROUND INFORMATION

Offshore platforms, subsea pipelines, drilling facilities, subsea cables, bridges and piers are important facilities for offshore oil and gas exploration, information transmission and transportation, and their foundation parts or supporting structures are composed of the underwater steel structure. With the extension of service time, the safety and durability of offshore steel structure is deteriorating year by year, and rust, spalling, cracking and other diseases appear. If measures are not taken in time, the damage is endless. The significance of repairing underwater steel structure is to prolong the service life of infrastructure, protect the safety of personnel and environment, and maintain the continuity of economic and social operation.

At present, there are three types of common underwater rapid repair material for marine steel structure: the marine epoxy resin, the underwater repair tape and the underwater repair adhesive.

The marine epoxy resin is a commonly used underwater repair material, which has good adhesion and corrosion resistance, and can be used to repair cracks and damage of steel structure. It has fast curing speed and can quickly form a strong repair layer underwater. However, due to the high viscosity of epoxy resin, special spraying equipment or injection tools are needed during construction process. In addition, conventional epoxy resin is prone to debonding failure underwater due to low temperature and high humidity underwater.

The underwater repair tape is a self-adhesive repair material, which can directly adhere to the damaged surface to form a sealing layer. It is easy to construct, does not require additional tools and equipment, and has good water resistance. However, the repair effect of underwater repair tape is limited by the adhesive property and strength of the tape itself, which may not provide enough support and protection for large damage.

The underwater repair adhesive is a specially designed adhesive with good adhesion and water resistance, which can be used to bond and repair the surface and components of marine steel structure, and form a reliable bond in underwater environment. However, the curing time of underwater repair adhesive may be long, and it is necessary to wait a certain time to achieve the best repair effect. In addition, the strength of the adhesive may be affected by the underwater environment and temperature.

At present, in the underwater rapid repair and emergency repair of marine and hydraulic steel structure, the following requirements are provided for the repair material:

Better adhesion and water resistance: underwater environment provides high requirements for adhesion and water resistance of repair material. In the underwater environment, the repair material must be capable of effectively adhering to the surface of the steel structure and be able to resist water erosion for a long time.

Fast construction speed: underwater repair of marine steel structure often needs to be done in a limited time to reduce downtime and maintenance costs. The repair material needs to have fast curing characteristics, so that the strong repair layer can be formed in a short time.

High strength and good durability: the repair material must have sufficient strength and durability to withstand external environmental challenges such as seawater flow, pressure, and structural stress. They need to maintain long-term stability to prevent re-injury.

Obviously, it is difficult for marine epoxy resin, underwater repair tape and underwater repair adhesive to meet the engineering requirements when they are used for underwater rapid repair and emergency repair of marine and hydraulic steel structure.

SUMMARY

It is an object of the present invention to provide a underwater rapid repair material for marine steel structure with the advantages of good water resistance, fast construction speed, high strength and the like, so as to solve the problems existed in the existing underwater repair material.

In order to achieve the above-mentioned object, the present invention provides the following technical solutions:

An underwater rapid repair material for marine steel structure comprises:

20 to 50 parts by weight of an alkali activation material, 3 to 12 parts by weight of a fast hardening waterborne polymer curing agent, 2 to 8 parts by weight of a fast hardening waterborne polymer precursor, 30 to 100 parts by weight of an aggregate, 1 to 5 parts by weight of an activator and 3 to 20 parts by weight of a water, the fast hardening waterborne polymer curing agent is prepared by a method which comprises the following steps 1 to 2, in the step 1, adding an isophorone diisocyanate, an O,O'-Bis(2-aminopropyl)polypropyleneglycol (Polyetheramine D 230) and a dopamine in a molar ratio of 1:1:1 to a reaction vessel which is provided with a stirring device, a reflux and gas absorption device, a thermometer and the nitrogen protection, and adding a N,N-dimethylformamide as a solvent, wherein the stirring rate is 100-500 rpm, the temperature is heated to 100-140° C., the reaction is performed for 2-5 hours, so that a yellow monomer A is obtained after reduced pressure distillation;

in the step 2, adding a bisphenols glycidyl ether, the yellow monomer A and a trimethylolpropane tris(3-mercaptopropionate) in a molar ratio of 2:2:1 to the reaction vessel which is provided with the stirring device, the reflux and gas absorption device, the thermometer and the nitrogen protection, wherein the stirring rate is 100-500 rpm, the temperature is heated to 100-140° C., the reaction is performed for 2-5 hours, and after maintaining of reflux and reduced pressure distillation, adding a 4,4'-bismaleimidodiphenylmethane, a triethylamine and a deionized water in a mass ratio of 1:2:6, stirring until all are dissolved as a homogeneous lotion mixture to obtain the fast hardening waterborne polymer curing agent;

the fast hardening waterborne polymer precursor is prepared by a method which comprises the following step:

adding the bisphenols glycidyl ether, a styrene oxide, a N,N,N',N'-tetraglycidyl-4,4'-diaminodiphenylmethane (4,4'-Methylenebis(N,N-diglycidylaniline)) and a 1,2-epoxydodecane in a molar ratio of 6:1:2:1 to the reaction vessel which is provided with the stirring device, the reflux and gas absorption device, the thermometer and the nitrogen protection, wherein the stirring rate is 100-500 rpm, the temperature is heated to 100-140° C., the reaction is performed for 2-5 hours, so that the fast hardening waterborne polymer precursor is obtained.

Advantageous Effects (1) The rapid repair material of the present invention can rapidly harden underwater, effectively bond the marine and hydraulic steel structure, has high strength and good durability, and has broad application prospects in the maintenance and repair of marine and hydraulic infrastructure, such as marine and coastal structures, reservoirs, bridge and culverts, sewage treatment facilities, subsea oil and gas pipelines and underwater communication facilities.

(2) The fast hardening waterborne polymer curing agent and precursor of the present invention can form a self-emulsifying star copolymer, which belongs to a hyper-branched polymer, the molecular configuration of which has a multi-branched central molecule and a plurality of linear branched molecules, and the molecular configuration of the fast hardening waterborne polymer is highly branched, the number of single-molecule reaction sites are more, and more dispersed, and has a lower viscosity, a higher solubility, and a better film-forming property and crosslinking degree relative to a linear polymer with the same molecular weight. As the polymerization of the central molecular segment expands, the branch segments are uniformly dispersed in three dimensions, and the density of surface functional groups increases. In the fast hardening inorganic cementitious materials, the network crosslinking ability and underwater dispersion resistance are improved macroscopically, and the expansion stress of inorganic components can be compatible to resist the solidification shrinkage of materials.

(3) The dopamine segment is grafted into the waterborne polymer curing agent to give the waterborne polymer a better underwater adhesion property to the steel structure; in the alkaline environment, the dopamine can be polymerized by oxidation polymerization to form polydopamine, and this self-polymerization makes dopamine an excellent adhesive; the polymerization of dopamine can achieve the bonding of materials by forming covalent bonds between amine groups and ketoalcohol groups.

(4) By introducing small molecules of aliphatic chains and alicyclic chains, the solubility parameters of the system can be adjusted, meanwhile, the low-temperature reactivity of the whole system can be enhanced, so that the pollution of the water body caused by the use of diluents and solvents can be avoided. At the same time, these oil-biased segments also have the ability of self-drainage and high adhesion at the interface of underwater repair. Moreover, the lower molecular weight waterborne polymers generally have a lower viscosity, and the lower viscosity contributes to the flowability and coating properties of the repair material, which makes the construction of the coating more uniform and enables better filling and wetting of the substrate; smaller molecular weights generally have faster cure rates, which can help to improve the production efficiency, shorten the drying time of the coating, thereby reducing production cycle and improving production capacity.

BRIEF DESCRIPTION OF THE DRAWINGS

FIG. 1 is a preparation road map of the fast hardening waterborne polymer curing agent and the fast hardening waterborne polymer precursor in Example 1 of the present invention.

DETAILED DESCRIPTION OF EMBODIMENTS

The alkali activation material has the characteristics of high early strength and chemical resistance, and its strong alkalinity is conducive to the re-passivation of corroded steel structure. However, the alkali activation material also has the problems of low tensile strength, high brittleness, poor anti-dispersion, insufficient underwater adhesion and the like, so it is difficult to achieve the expected repair effect when it is directly used in underwater construction. The waterborne polymer can effectively increase the underwater adhesion and ductility of inorganic cementitious materials, but the waterborne polymer is easily broken in the high alkaline environment, and the curing cycle of the existing waterborne polymer is long, so it is difficult to achieve rapid hardening of repair material.

Therefore, if the waterborne polymer is rapidly solidified by molecular modification, then hardening it and cooperating together with the alkali activation material to make full use of the advantages of the two materials, the inorganic-organic toughness material system can be formed, and the underwater rapid repair material for marine steel structure, which can be rapidly hardened, effectively bonded and have high-strength, is prepared.

With regard to the current problem existed in the existing underwater rapid repair material for marine steel structure, the present invention provides an underwater rapid repair material for marine steel structure comprises:
  20 to 50 parts by weight of an alkali activation material, 3 to 12 parts by weight of a fast hardening waterborne polymer curing agent, 2 to 8 parts by weight of a fast hardening waterborne polymer precursor, 30 to 100 parts by weight of an aggregate, 1 to 5 parts by weight of an activator and 3 to 20 parts by weight of a water.

In preferred examples of the present invention, the alkali activation material comprises at least one of a metakaolin, a mine slag, a fly ash, a silica fume, a steel slag and a glass dust.

In preferred examples of the present invention, the aggregate comprises at least one of a river sand, a sea sand, a machine-made sand and a rubble.

In preferred examples of the present invention, the activator comprises at least one of a sodium hydroxide, a potassium hydroxide, a lithium hydroxide, a sodium silicate, a potassium silicate, a lithium silicate and a magnesium fluorosilicate.

In preferred examples of the present invention, the fast hardening waterborne polymer curing agent is prepared by a method which comprises the following steps 1 to 2,
  in the step 1, adding an isophorone diisocyanate, an O,O'-Bis(2-aminopropyl)polypropyleneglycol and a dopamine to a reaction vessel which is provided with a stirring device, a reflux and gas absorption device, a thermometer and nitrogen protection, and adding a N,N-dimethylformamide in moderation as a solvent, wherein the stirring rate is 100-500 rpm, the temperature is heated up, the reaction is performed, so that a yellow monomer A is obtained after reduced pressure distillation;
  in the step 2, adding a bisphenols glycidyl ether, the yellow monomer A and a trimethylolpropane tris(3-mercaptopropionate) to the reaction vessel which is provided with the stirring device, the reflux and gas absorption device, the thermometer and the nitrogen protection, wherein the stirring rate is 100-500 rpm, the temperature is heated up, the reaction is performed, and after maintaining of reflux and reduced pressure distillation, adding a 4,4'-bismaleimidodiphenylmethane, a triethylamine and a deionized water, stirring until all are dissolved as a homogeneous lotion mixture to obtain the fast hardening waterborne polymer curing agent.

In preferred examples of the present invention, the fast hardening waterborne polymer precursor is prepared by a method which comprises the following step:

adding the bisphenols glycidyl ether, a styrene oxide, a N,N,N',N'-tetraglycidyl-4,4'-diaminodiphenylmethane and a 1,2-epoxydodecane to the reaction vessel which is provided with the stirring device, the reflux and gas absorption device, the thermometer and the nitrogen protection, wherein the stirring rate is 100-500 rpm, the temperature is heated up so that the fast hardening waterborne polymer precursor is obtained.

In preferred examples of the present invention, the bisphenols glycidyl ether comprises at least one of a bisphenol A-based glycidyl ether, a bisphenol S-based glycidyl ether and a bisphenol F-based glycidyl ether, such as the bisphenol A-based diglycidyl ether, the bisphenol S-based diglycidyl ether and the bisphenol F-based diglycidyl ether.

In preferred examples of the present invention, in the step 1, the molar ratio of the isophorone diisocyanate, the O,O'-Bis(2-aminopropyl)polypropyleneglycol and the dopamine is 1:1:1, the temperature is heated to 100-140° C., the reaction is performed for 2-5 hours; in the step 2, the molar ratio of the bisphenols glycidyl ether, the yellow monomer A and the trimethylolpropane tris(3-mercaptopropionate) is 2:2:1, and the mass ratio of the 4,4'-bismaleimidodiphenylmethane, the triethylamine and the deionized water is 1:2:6, the temperature is heated to 100-140° C., the reaction is performed for 2-5 hours.

In preferred examples of the present invention, a molar ratio of the bisphenols glycidyl ether, the styrene oxide, the N,N,N',N'-tetraglycidyl-4,4'-diaminodiphenylmethane and the 1,2-epoxydodecane is 6:1:2:1, the temperature is heated to 100-140° C., the reaction is performed for 2-5 hours.

The present invention also provides a preparation method of any of the aforementioned underwater rapid repair material for marine steel structure comprises the following step: weighing each component raw material in a weight ratio, mixing the alkali activation material, the aggregate and the activator evenly to obtain a dry material, then mixing the fast hardening waterborne polymer curing agent with the fast hardening waterborne polymer precursor and the water to obtain the fast hardening waterborne polymer, and mixing it evenly with the dry material, so as to obtain the underwater rapid repair material for marine steel structure.

Below is a detailed explanation of the underwater rapid repair material for marine steel structure and preparation method thereof of the present invention through the specific examples.

The drug sources used in the following examples are as follows:

Sodium silicate: analytical pure, which is purchased from Shanghai Aladdin Biochemical Technology Co., Ltd.;
Sodium hydroxide: analytical pure, which is purchased from Shanghai Aladdin Biochemical Technology Co., Ltd.;
Potassium hydroxide: analytical pure, which is purchased from Shanghai Aladdin Biochemical Technology Co., Ltd.;
Isophorone diisocyanate: analytical pure, which is purchased from Shanghai Aladdin Biochemical Technology Co., Ltd.;
O,O'-Bis(2-aminopropyl)polypropyleneglycol: which is purchased from Shanghai Aladdin Biochemical Technology Co., Ltd.;
Dopamine: analysis reference substance, which is purchased from Shanghai Aladdin Biochemical Technology Co., Ltd.;
N,N-dimethylformamide: analytical pure, which is purchased from Shanghai Aladdin Biochemical Technology Co., Ltd.;
Bisphenol A-based diglycidyl ether: chromatographically pure, which is purchased from Shanghai Aladdin Biochemical Technology Co., Ltd.;
Trimethylolpropane tris(3-mercaptopropionate): purity≥95%, which is purchased from Shanghai Aladdin Biochemical Technology Co., Ltd.;
4,4'-bismaleimidodiphenylmethane: purity≥96%, which is purchased from Shanghai Aladdin Biochemical Technology Co., Ltd.;
1,2-epoxydodecane: the purity is 95%, which is purchased from Shanghai Aladdin Biochemical Technology Co., Ltd.;
N,N,N',N'-tetraglycidyl-4,4'-diaminodiphenylmethane: which is purchased from Shanghai Aladdin Biochemical Technology Co., Ltd.;
EPICLON H-502-42W type waterborne epoxy resin: the solid content is 37.0%-41.0%, the manufacturer is Color & Comfort.

Example 1

The present example provides an underwater rapid repair material for marine steel structure comprises:

50 parts by weight of the alkali activation material, 11 parts by weight of the fast hardening waterborne polymer curing agent, 9 parts by weight of the fast hardening waterborne polymer precursor, 100 parts by weight of the aggregate, 5 parts by weight of the activator and 20 parts by weight of the water.

Wherein, in parts by weight, the alkali activation material is obtained by mixing the mine slag, the fly ash and the metakaolin in a weight ratio of 4:1:1; the activator is obtained by mixing the sodium silicate, the sodium hydroxide and the potassium hydroxide in a weight ratio of 5:1:1; the aggregate is obtained by mixing the river sand and the rubble in a weight ratio of 2:3.

Wherein, the fast hardening waterborne polymer curing agent and the fast hardening waterborne polymer precursor is prepared by the following method, as shown in FIG. 1:

(1) adding the isophorone diisocyanate, the O,O'-Bis(2-aminopropyl)polypropyleneglycol, the dopamine and the N,N-dimethylformamide in a molar ratio of 1:1:1:1 to a reaction vessel which is provided with the stirring device, the reflux and gas absorption device, the thermometer and the nitrogen protection, wherein the stirring rate is 300 rpm, the temperature is heated to 120° C., the reaction is performed for 3 hours, so that the yellow monomer A is obtained after reduced pressure distillation;

(2) adding the bisphenol A-based diglycidyl ether, the yellow monomer A and the trimethylolpropane tris(3-mercaptopropionate) in a molar ratio of 2:2:1 to the reaction vessel which is provided with the stirring device, the reflux and gas absorption device, the thermometer and the nitrogen protection, wherein the temperature is heated to 120° C., the reaction is performed for 3 hours, and after maintaining of reflux and reduced pressure distillation, adding the 4,4'-bismaleimidodiphenylmethane, the triethylamine and the deionized water in a mass ratio of 1:2:6, stirring until all are dissolved as a homogeneous lotion mixture to obtain the fast hardening waterborne polymer curing agent;

(3) adding the bisphenol A-based diglycidyl ether, the styrene oxide, the N,N,N',N'-tetraglycidyl-4,4'-diaminodiphenylmethane and the 1,2-epoxydodecane in a molar ratio of 6:1:2:1 to the reaction vessel which is provided with the stirring device, the reflux and gas absorption device, the thermometer and the nitrogen protection, wherein the stirring rate is 500 rpm, the temperature is heated to 120° C., the reaction is performed for 3 hours, so that the fast hardening waterborne polymer precursor is obtained.

The preparation method of the underwater rapid repair material for marine steel structure of the present invention comprises the following step:

weighing each component raw material in a weight ratio, mixing the alkali activation material, the aggregate and the activator evenly to obtain a dry material, then mixing the fast hardening waterborne polymer curing agent with the fast hardening waterborne polymer precursor and the water to obtain the fast hardening waterborne polymer, and mixing it evenly with the dry material, so as to obtain the underwater rapid repair material for marine steel structure.

The prepared underwater rapid repair material is poured into the test mold in underwater, the surface is covered with film for curing (25° C.), the tested initial setting time is 0.5 hours, the tested final setting time is 1.1 hours, and after the surface is covered with film for curing for 3 hours, with reference to the test method in the standard JCT 984-2011 *Polymer Cement Waterproof Mortar*, the performances are measured as follows:

the compressive strength is 55 MPa, the flexural strength is 9.1 MPa, the bond strength to steel is 6.7 Mpa, the porosity is 3.2%, and the axial tensile toughness ratio is 2.3.

Example 2

The present example provides an underwater rapid repair material for marine steel structure comprises:

20 parts by weight of the alkali activation material, 5.5 parts by weight of the fast hardening waterborne polymer curing agent, 4.5 parts by weight of the fast hardening waterborne polymer precursor, 30 parts by weight of the aggregate, 1 part by weight of the activator and 3 parts by weight of the water.

Wherein, in parts by weight, the alkali activation material is obtained by mixing the steel slag, the glass dust and the silica fume in a weight ratio of 1:4:1; the activator is obtained by mixing the potassium silicate, the magnesium fluorosilicate, the lithium silicate and the sodium hydroxide in a weight ratio of 3:1:1:1; the aggregate is obtained by mixing the river sand and the sea sand in a weight ratio of 5:1.

Wherein, the fast hardening waterborne polymer curing agent and the fast hardening waterborne polymer precursor is prepared by the following method:

(1) adding the isophorone diisocyanate, the O,O'-Bis(2-aminopropyl)polypropyleneglycol, the dopamine and the N,N-dimethylformamide in a molar ratio of 1:1:1:1 to the reaction vessel which is provided with the stirring device, the reflux and gas absorption device, the thermometer and the nitrogen protection, wherein the stirring rate is 100 rpm, the temperature is heated to 140° C., the reaction is performed for 3 hours, so that the yellow monomer A is obtained after reduced pressure distillation;

(2) adding the bisphenol A-based diglycidyl ether, the yellow monomer A and the trimethylolpropane tris(3-mercaptopropionate) in a molar ratio of 2:2:1 to the reaction vessel which is provided with the stirring device, the reflux and gas absorption device, the thermometer and the nitrogen protection, wherein the temperature is heated to 140° C., the reaction is performed for 2 hours, and after maintaining of reflux and reduced pressure distillation, adding the 4,4'-bismaleimidodiphenylmethane, the triethylamine and the deionized water in a mass ratio of 1:2:6, stirring until all are dissolved as a homogeneous lotion mixture to obtain the fast hardening waterborne polymer curing agent;

(3) adding the bisphenol A-based diglycidyl ether, the styrene oxide, the N,N,N',N'-tetraglycidyl-4,4'-diaminodiphenylmethane and the 1,2-epoxydodecane in a molar ratio of 6:1:2:1 to the reaction vessel which is provided with the stirring device, the reflux and gas absorption device, the thermometer and the nitrogen protection, wherein the stirring rate is 500 rpm, the temperature is heated to 140° C., the reaction is performed for 1 hour, so that the fast hardening waterborne polymer precursor is obtained.

The preparation method of the underwater rapid repair material for marine steel structure provided in present example is the same as that in Example 1, and will not be repeated here.

The underwater rapid repair material provided in present example is poured into the test mold in underwater, the surface is covered with film for curing (25° C.), the tested initial setting time is 0.5 hours, the tested final setting time is 1.1 hours, and after the surface is covered with film for curing for 3 hours, with reference to the standard JCT 984-2011 *Polymer Cement Waterproof Mortar*, the performances are measured as follows:

the compressive strength is 62 MPa, the flexural strength is 12.1 MPa, the bond strength to steel is 7.7 Mpa, the porosity is 3.2%, and the axial tensile toughness ratio is 1.6.

Example 3

The present example provides an underwater rapid repair material for marine steel structure comprises:

30 parts by weight of the alkali activation material, 3 parts by weight of the fast hardening waterborne polymer curing agent, 2 parts by weight of the fast hardening waterborne polymer precursor, 50 parts by weight of the aggregate, 2 parts by weight of the activator and 10 parts by weight of the water.

Wherein, in parts by weight, the alkali activation material is obtained by mixing the steel slag, the glass dust and the silica fume in a weight ratio of 3:3:1; the activator is obtained by mixing the potassium hydroxide, the magnesium fluorosilicate, the lithium silicate and the lithium hydroxide in a weight ratio of 4:1:2:1; the aggregate is obtained by mixing the river sand, the sea sand and the machine-made sand in a weight ratio of 5:1:1.

Wherein, the fast hardening waterborne polymer curing agent and the fast hardening waterborne polymer precursor is prepared by the following method:

(1) adding the isophorone diisocyanate, the O,O'-Bis(2-aminopropyl)polypropyleneglycol, the dopamine and the N,N-dimethylformamide in a molar ratio of 1:1:1:1 to the reaction vessel which is provided with the stirring device, the reflux and gas absorption device, the thermometer and the nitrogen protection, wherein the stirring rate is 100 rpm, temperature is heated to 140° C., the reaction is performed for 3 hours, so that the yellow monomer A is obtained after reduced pressure distillation;

(2) adding the bisphenol A-based diglycidyl ether, the yellow monomer A and the trimethylolpropane tris(3-mercaptopropionate) in a molar ratio of 2:2:1 to the reaction vessel which is provided with the stirring device, the reflux and gas absorption device, the thermometer and the nitrogen protection, wherein the temperature is heated to 140° C., the reaction is performed for 2 hours, and after maintaining of reflux and reduced pressure distillation, adding the 4,4'-bismaleimidodiphenylmethane, the triethylamine and the deionized water in a mass ratio of 1:2:6, stirring until all are dissolved as a homogeneous lotion mixture to obtain the fast hardening waterborne polymer curing agent;

(3) adding the bisphenol A-based diglycidyl ether, the styrene oxide, the N,N,N',N'-tetraglycidyl-4,4'-diaminodiphenylmethane and the 1,2-epoxydodecane in a molar ratio of 6:1:2:1 to the reaction vessel which is provided with the stirring device, the reflux and gas absorption device, the thermometer and the nitrogen protection, wherein the stirring rate is 500 rpm, the temperature is heated to 140° C., the reaction is performed for 1 hour, so that the fast hardening waterborne polymer precursor is obtained.

The preparation method of the underwater rapid repair material for marine steel structure provided in present example is the same as that in Example 1, and will not be repeated here.

The underwater rapid repair material provided in present example is poured into the test mold in underwater, the surface is covered with film for curing (25° C.), the tested initial setting time is 0.7 hours, the tested final setting time is 1.4 hours, and after the surface is covered with film for curing for 3 hours, with reference to the standard JCT 984-2011 *Polymer Cement Waterproof Mortar*, the performances are measured as follows:

the compressive strength is 58 MPa, the flexural strength is 9.1 MPa, the bond strength to steel is 5.6 Mpa, the porosity is 3.2%, and the axial tensile toughness ratio is 1.6.

Comparative Example 1

The present comparative example provides an underwater rapid repair material for marine steel structure comprises:
40 parts by weight of the alkali activation material, 70 parts by weight of the aggregate, 4 parts by weight of the activator and 15 parts by weight of the water.

Wherein, the alkali activation material comprises: 2 parts by weight of the metakaolin, 1 part by weight of the steel slag and 2 parts by weight of the mine slag, the aggregate comprises: 4 parts by weight of the river sand and 1 part by weight of the rubble, and the activator comprises: 1 part by weight of the sodium silicate, 2 parts by weight of the lithium silicate, 1 part by weight of the potassium silicate and 1 part by weight of the sodium hydroxide.

The preparation method of the underwater rapid repair material for marine steel structure is as follows:

the alkali activation material, the activator and the aggregate are mixed uniformly to obtain a dry mixed material; then the dry mixed material is mixed with the water to obtain a slurry, and finally the slurry is poured into a test mould in underwater for pouring. Due to the obvious dispersion of the slurry in the water, the slurry is separated from the aggregate and cannot be formed.

Comparative Example 2

The present comparative example provides an underwater rapid repair material for marine steel structure comprises:
50 parts by weight of the alkali activation material, 20 parts of ordinary waterborne polymer, 50 parts by weight of the aggregate, 3 parts by weight of the activator and 10 parts by weight of the water.

Wherein, the alkali activation material comprises: 5 parts by weight of the mine slag, 5 parts by weight of the fly ash and 2 parts by weight of the glass dust, the activator comprises: 1 part by weight of the sodium hydroxide, 2 parts by weight of the sodium silicate, 1 part by weight of the potassium silicate and 1 part by weight of the lithium hydroxide, the aggregate comprises: 1 part by weight of the river sand and 4 parts by weight of the machine-made sand, and the EPICLON H-502-42W type waterborne epoxy resin is selected as the ordinary waterborne polymer, which has good metal adhesion and water resistance and is commonly used in metal anti-corrosion coating construction.

The preparation method of the underwater rapid repair material for marine steel structure is as follows:

the alkali activation material, the activator and the aggregate are mixed uniformly to obtain a dry mixed material; then the dry mixed material is mixed with the water to obtain a slurry, and then the above-mentioned ordinary waterborne polymer is mixed, and finally the slurry is poured into a test mould in underwater for pouring. The surface is covered with film for curing at 25° C., the tested initial setting time is 2.5 hours, the tested final setting time is 5.1 hours. Due to the ordinary waterborne epoxy polymer has a long curing cycle in underwater, and rapidly demulsify and flocculate under high alkaline environment, it is difficult to construct, which results in that the performances of repair material can not meet the requirements of underwater rapid repair. The performance indicators of the repair material are tested after the surface is covered with film for curing for 3 hours.

With reference to the standard JCT 984-2011 *Polymer Cement Waterproof Mortar*, the performances are measured as follows:

the compressive strength (3 hours) is 7 MPa, the flexural strength (3 hours) is 0.2 MPa, the bond strength (3 hours) is 0.1 Mpa, the porosity is 6.2%, and the axial tensile toughness ratio is 0.5.

Comparative Example 3

The present comparative example provides an underwater rapid repair material for marine steel structure. Based on Example 1, the content of the fast hardening waterborne polymer curing agent and the fast hardening waterborne polymer precursor is adjusted, while the ratios of the other raw materials are unchanged. Specifically, in the present comparative example, the fast hardening waterborne polymer curing agent is 0.55 parts and the fast hardening waterborne polymer precursor is 0.45 parts.

According to the preparation method of Example 1, the raw materials are made into the underwater rapid repair material for marine steel structure, with reference to the standard JCT 984-2011 *Polymer Cement Waterproof Mortar*, the performances are measured as follows:

the compressive strength (3 hours) is 16 MPa, the flexural strength (3 hours) is 1.1 MPa, the bond strength (3 hours) is 0.4 Mpa, the axial tensile toughness ratio is 1.0, the porosity is 5.3%, the initial setting time is 1.0 hour, the final setting time is 1.4 hours, the content of the fast hardening waterborne polymer is too low to form an interpenetrating network structure, and a part of repair material occur segregation in underwater, which has a negative impact on material hardening, resulting in a significant decrease in compressive, flexural, and bonding strength.

According to the test results, it can be seen that the underwater rapid repair material prepared in Examples 1-3 will not occur significant dispersion in water, with short initial setting time and final setting time. It can quickly harden after underwater construction, and the compressive strength can reach 62 MPa and the flexural strength can reach 12.1 MPa after 3 hours. After construction, it can quickly solidify with high strength and strong flexural ability; the underwater rapid repair material has a bonding strength to steel of 7.7 MPa, which can adhere well to the surface of steel structure and achieve the repair of steel structure.

By comparing the above examples and comparative examples, it can be seen that, in the examples of the present invention, the fast hardening waterborne polymer is obtained through the reaction of the fast hardening waterborne polymer curing agent and the fast hardening waterborne polymer precursor, which can effectively prevent the dispersion phenomenon and segregation phenomenon and the like of repair material in water, reduce the porosity of repair material after solidification, significantly shorten the initial setting time and final setting time, improve the bonding strength of material, and thus solve the problems of poor water resistance and the like in the existing underwater repair material.

In summary, the present invention provides a underwater rapid repair material for marine steel structure and preparation method thereof, this underwater rapid repair material for marine steel structure can quickly harden in underwater, effectively bond the underwater steel structure, and has high strength and good durability. It has broad application prospects in the maintenance and emergency repair of hydraulic and marine infrastructure such as marine coastal structures, reservoirs and hydropower stations, bridges and culverts, sewage treatment facilities, submarine oil and gas pipelines and underwater communication facilities.

The invention claimed is:

1. An underwater rapid repair material for marine steel structure, characterized in that, the underwater rapid repair material for marine steel structure comprises:

20 to 50 parts by weight of an alkali activation material, 3 to 12 parts by weight of a fast hardening waterborne polymer curing agent, 2 to 8 parts by weight of a fast hardening waterborne polymer precursor, 30 to 100 parts by weight of an aggregate, 1 to 5 parts by weight of an activator and 3 to 20 parts by weight of a water, the fast hardening waterborne polymer curing agent is prepared by a method which comprises the following steps 1 to 2, in the step 1, adding an isophorone diisocyanate, an O,O'-Bis(2-aminopropyl)polypropyleneglycol and a dopamine in a molar ratio of 1:1:1 to a reaction vessel which is provided with a stirring device, a reflux and gas absorption device, a thermometer and nitrogen protection, and adding a N,N-dimethylformamide as a solvent, wherein stirring rate is 100-500 rpm, temperature is heated to 100-140° C., reaction is performed for 2-5 hours, so that a yellow monomer A is obtained after reduced pressure distillation;

in the step 2, adding a bisphenol ether, the yellow monomer A and a trimethylolpropane tris(3-mercaptopropionate) in a molar ratio of 2:2:1 to the reaction vessel which is provided with the stirring device, the reflux and gas absorption device, the thermometer and the nitrogen protection, wherein the stirring rate is 100-500 rpm, the temperature is heated to 100-140° C., the reaction is performed for 2-5 hours, and after maintaining of reflux and reduced pressure distillation, adding a 4,4'-bismaleimidodiphenylmethane, a triethylamine and a deionized water in a mass ratio of 1:2:6, stirring until all are dissolved as a homogeneous lotion mixture to obtain the fast hardening waterborne polymer curing agent;

the fast hardening waterborne polymer precursor is prepared by a method which comprises the following step:

adding the bisphenol glycidyl ether, a styrene oxide, a N,N,N',N'-tetraglycidyl-4,4'-diaminodiphenylmethane and a 1,2-epoxydodecane in a molar ratio of 6:1:2:1 to the reaction vessel which is provided with the stirring device, the reflux and gas absorption device, the thermometer and the nitrogen protection, wherein the stirring rate is 100-500 rpm, the temperature is heated to 100-140° C., the reaction is performed for 2-5 hours, so that the fast hardening waterborne polymer precursor is obtained.

2. The underwater rapid repair material for marine steel structure according to claim 1, characterized in that, the alkali activation material comprises at least one of a metakaolin, a mine slag, a fly ash, a silica fume, a steel slag and a glass dust.

3. The underwater rapid repair material for marine steel structure according to claim 1, characterized in that, the aggregate comprises at least one of a river sand, a sea sand, a machine-made sand and a rubble.

4. The underwater rapid repair material for marine steel structure according to claim 1, characterized in that, the activator comprises at least one of a sodium hydroxide, a potassium hydroxide, a lithium hydroxide, a sodium silicate, a potassium silicate, a lithium silicate and a magnesium fluorosilicate.

5. The underwater rapid repair material for marine steel structure according to claim 1, characterized in that, the bisphenol glycidyl ether comprises at least one of a bisphenol A-based glycidyl ether, a bisphenol S-based glycidyl ether and a bisphenol F-based glycidyl ether.

* * * * *